Patented Dec. 14, 1948

2,456,258

UNITED STATES PATENT OFFICE 2,456,258

P-AMINO PHENYL-P'-AMINO PYRIDYL SULFONE AND A PROCESS OF MAKING THE SAME

Max Dohrn, Berlin-Charlottenburg, and Otto Laubereau, Berlin-Neukolln, Germany; vested in the Attorney General of the United States No Drawing. Application December 23, 1940, Serial No. 371,412. In Germany December 19, 1939

19 Claims. (Cl. 260—239.6)

This invention relates to sulfones and more particularly to p-aminophenyl-p'-amino pyridyl sulfone and a method of making the same.

As is well known p,p'-diamino diphenyl sulfone has an extraordinary bactericide effect, but at the same time it is also rather toxic, so that it did not find use in human therapy.

Now, we have found that a sulfone of similar constitution, wherein one phenyl residue is replaced by a pyridyl residue, is of almost equal effectiveness to the p,p'-diamino diphenyl sulfone, but is distinguished therefrom by a considerably lower toxicity. This sulfone corresponds to the following structural formula:

$$NH_2.C_6H_4.SO_2.C_5H_3N.NH_2$$

Compounds of this kind are obtained according to methods already known for the manufacture of sulfones (see, for instance, Houben-Weyl "Die Methoden der organischen Chemie," 3rd edition, vol. 3, pp. 1278 ff.).

As especially suitable there has proved the method consisting in reacting a salt of a benzene sulfinic acid, suitably an alkali metal salt, containing in p-position to the sulfinic acid group an amino group or a group convertible thereinto, for instance, an acyl amino, nitro, nitroso, azo, hydrazo and the like groups, with a halogenated pyridine, also containing an amino group or a group convertible thereinto, suitably in p-position to the halogen.

This reaction may be illustrated by the following formulas $$X.R.SO_2Me + Hal.R'X' \rightarrow$$
$$X.R.SO_2.R'.X' + HalMe$$

wherein X and X' indicate an amino group or a group convertible thereinto, while R represents a benzene radical, R' a pyridyl radical, Me a metal, especially an alkali metal and Hal halogen. Compare U. S. application Serial No. 237,926, now Patent No. 2,331,009. As halogenated pyridine compounds there are preferably employed compounds in which the halogen is rendered especially reactive by an activating substituent. Especially suitable for this purpose has proved the nitro group, which, after condensation, may be converted into the amino group. Thus, the p-amino phenyl-p'-amino pyridyl sulfone is obtained by reacting 2-chloro-5-nitro pyridine with the sodium salt of an acyl amino phenyl sulfinic acid with subsequent reduction and saponification. The transformation may be carried out while heating in a suitable solvent, for instance, in alcohol, or under pressure. The forming of the amino group is, if need be, brought about by the aid of hydrolysis or reduction or the like measures. The reduction of a nitro group present in the pyridyl residue may also be carried out simultaneously with the saponification of an acylamino group present in the phenyl residue. Thus, for instance, on reduction by means of stannous chloride or sodium hydrosulfite in glacial acetic acid at 40–60° C. the nitro group is converted into the amino group while an acyl amino group present remains unchanged thereby. When using in the place of the above mentioned reducing agents stannous chloride and concentrated hydrochloric acid at a temperature of 80–90° C. the acyl group is split off at the same time. Hence the latter method of reduction is of special importance as it saves one step, namely separate hydrolysis of the acylamino group.

In order to obtain the sulfones claimed one may also proceed in such a manner that sulfides or sulfoxides containing an amino phenyl group as well as an amino pyridyl group, are oxidized to the corresponding sulfones. This reaction may be illustrated by the following formulas $$X.R.SO.R'.X' \rightarrow X.R.SO_2.R'.X'$$
$$X.R.S.R'.X' \rightarrow X.R.SO_2.R'.X'$$

wherein X and X', R and R' have the same meaning as indicated above. For this reaction such compounds are preferably used as starting material in which the amino groups are transformed into groups which are re-convertible into amino groups. The oxidation of these sulfides or sulfoxides is carried out in a customary manner, using, for instance, nitric acid, potassium permanganate, chromic acid, hydrogen peroxide, while heating, and others.

The sulfides used may be obtained by reacting the salts, especially the alkali salts of the corresponding mercapto compounds with the above mentioned halogenated pyridines. This reaction may be illustrated by the following formulas $$X.R.S Me + Hal.R'.X' \rightarrow X.R.S.R'.X' + HalMe$$

wherein X and X', R and R', Me and Hal have the same meaning as indicated above.

The sulfoxides employed for oxidation to sulfones may be produced, for instance, by rearrangement of the corresponding sulfinic acid amides which is facilitated by the presence of halogen hydrides or of the halogen hydride salt of the amine forming the amide. One may further proceed in such a manner that the corresponding sulfuric acids or their halogenides are condensed with aminopyridines. Such ways of procedure are described, for instance, in U. S. application Serial No. 314,512, now Patent No. 2,343,162. The reactions described above may be illustrated by the following formulas:

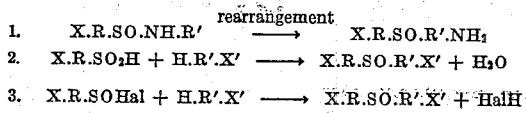

1. X.R.SO.NH.R' →(rearrangement) X.R.SO.R'.NH₂
2. X.R.SO₂H + H.R'.X' → X.R.SO.R'.X' + H₂O
3. X.R.SOHal + H.R'.X' → X.R.SO.R'.X' + HalH Of course, other methods for making the corresponding sulfides and sulfoxides may be used likewise.

Furthermore, other methods of manufacturing the sulfones claimed may be employed, though in general lesser yields are obtained thereby than with the above-mentioned methods, while mixtures of asymmetric and symmetric products may be produced. Of course, there are not to be employed such methods in which the amino groups or the groups convertible thereinto are influenced or even split off during reaction. Among the methods that may be employed may be mentioned the following:

The corresponding benzene sulfinic acid halogenides are condensed with pyridines containing a group convertible into the amino group, whereby the reaction is accelerated and facilitated by the presence of an aluminum halogenide, such as aluminum chloride. The condensation takes place according to the following formula:

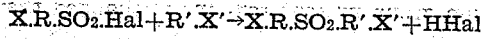

X.R.SO₂.Hal + R'.X' → X.R.SO₂.R'.X' + HHal after condensation the groups convertible into amino groups present in the sulfone, may be transferred into amino groups, for instance, by the aid of hydrolysis or reduction, so as to yield p,p'-diamino phenyl pyridyl sulfone.

Instead of the benzene sulfonic acid halogenides the sulfonic acids themselves may be employed whereby the reaction is carried out in the presence of dehydrating agents, such as, for instance, phosphorus pentoxide. The yield obtained by this method, however, is appreciably lower than by the above mentioned processes. Reactions starting with sulfonic acids or their halogenides are described, for instance, in U. S. application Serial No. 335,868, Patent 2,328,548.

The following examples serve to illustrate the invention, without, however, limiting the same to them.

*Example 1*

200 gs. of the sodium salt of p-acetyl amino benzene sulfinic acid are boiled under reflux with 156 gs. of 2-chloro-5-nitro pyridine in 4.5 liters of alcohol for 7 to 8 hours. After allowing the reaction mixture to stand for a rather long period of time the crystallized mass is filtered off, thoroughly washed with water and recrystallized from alcohol. Melting point 225–226° C.

5 gs. of the thus obtained p-acetyl amino phenyl-p'-nitro pyridyl sulfone are dissolved in 40 ccs. of glacial acetic acid and within about 10 minutes 10 gs. of sodium hydrosulfite dissolved in 50 ccs. of water, are added to the hot solution while stirring. After heating on the water bath for another hour, the solution is evaporated to dryness in a vacuum, the residue treated with dilute sodium hydroxide solution until it shows lasting alkaline reaction, and recrystallized from dilute alcohol. Melting point 271–272° C.

For saponification 3 gs. of the p-acetyl amino phenyl-p'-amino pyridyl sulfone are heated to boiling in 60 ccs. of 20% hydrochloric acid for half an hour, the cooled solution is mixed with ice water and rendered alkaline with sodium hydroxide solution while cooling. The p,p'-diamino phenyl-pyridyl-sulfone precipitated melts at 183° C. (from dilute alcohol).

The reduction of the nitro compound with stannous chloride in glacial acetic acid is carried out in the following way:

Over 6.4 gs. of the nitro compound there are poured portion by portion 32 ccs. of a 45% solution of stannous chloride in glacial acetic acid within about 30 minutes, keeping the temperature thereby at 50–60° C. After allowing the reaction mixture to stand for a rather long period of time the tin double salt precipitated is treated with dilute sodium hydroxide solution in order to convert it into the free base.

*Example 2*

65 gs. of the p-acetyl amino phenyl-p'-nitro pyridyl sulfone obtained according to Example 1 are suspended in 350 ccs. of concentrated hydrochloric acid and reduced in the usual manner with 150 gs. of stannous chloride in 250 ccs. of concentrated hydrochloric acid at 40–50° C. and thereupon heated for one more hour on the water bath. The tin double salt precipitates on standing. It is converted into the free base in the usual manner. The p,p'-diamino phenyl pyridyl sulfone with a melting point of 183–184° C. (from dilute alcohol) is obtained with a yield of 30 gs.

*Example 3*

5.0 gs. of the sodium salt of p-acetyl amino benzene sulfinic acid and 3.2 gs. of 2-chloro-5-amino pyridine in 15 ccs. of methanol are heated in a sealed tube up to 160° C. for 8 hours. After cooling, the contents of the tube are filtered off by suction and the filtrate is precipitated with water, whereby the p-acetylamino phenyl-p'-amino pyridyl sulfone precipitates at first in the form of an oil, which solidifies after long standing.

The acetyl compound is recrystallized from dilute alcohol and saponified to the p,p'-diamino phenyl pyridyl sulfone according to Example 1.

*Example 4*

3.8 gs. of nitro phenyl sulfinic acid and 2.0 gs. of anhydrous calcium acetate and 3.2 gs. of 2-chloro-5-paranitro pyridine in 120 ccs. of ethanol are boiled under reflux for 7 to 8 hours. After cooling the precipitate obtained, representing p-nitro phenyl-p'-nitro pyridyl sulfone, is filtered off by suction, washed with water and recrystallized from glacial acetic acid. Melting point 253–254° C. Yield 70% (of the theory).

3.6 gs. of p-nitro phenyl-p'-nitro pyridyl sulfone are reduced in 200 ccs. of methanol by means of hydrogen in the presence of a nickel catalyst. After having taken up the calculated amount of hydrogen, the catalyst is filtered off and the filtrate is concentrated by evaporation. The thereby obtained crude product of p-amino-phenyl-p'-amino pyridyl sulfone melts at 183–184° C. Yield 70–80%.

*Example 5*

15.5 gs. of p-nitro thiophenol and 15.8 gs. of 2-chloro-5-nitro pyridine are dissolved at 75° C. in 370 ccs. of ethanol. To this solution there are added 5.6 gs. of potassium hydroxide in 200 ccs. of ethanol. Subsequently the solution is heated to boiling for about half an hour on the steam bath. After cooling and filtering off by suction the crystalline precipitate, which, besides p-nitrophenyl-p'-nitro pyridyl sulfide, contains p,p'-dinitro diphenyl sulfide, is recrystallized from methanol, wherein the latter is insoluble. The p-nitrophenyl-p'-nitro pyridyl sulfide melts at 125–126° C. Yield: 60–70%.

3.9 gs. of p-nitro phenyl-p'-nitro pyridyl sulfide are dissolved while heating in 50 ccs. of glacial acetic acid, and 3.0 gs. of chromic acid anhydride are added to the solution at a temperature of about 90° C. Already during the introduction of the chromic acid a crystalline precipitate begins to form. After keeping the temperature for about 30 minutes at 90° C. and cooling, the p-nitro phenyl-p'-nitro pyridyl sulfone obtained is filtered off by suction, washed with water and recrystallized from glacial acetic acid. Melting point 253–254° C. Yield 50%.

The reduction of the dinitro compound to the diamino compound is carried out according to Example 4.

Of course, many changes and variations in the reaction conditions, the starting materials used, the solvents and catalysts employed, the reaction temperature and duration, the methods of isolating and purifying the intermediate and final products and so forth may be employed by those skilled in the art in accordance with the principles set forth herein and in the claims annexed hereto.

What we claim is:

1. A process which comprises reacting a p-acylaminobenzene sulfinic acid with a nuclear monohalogen substituted heterocyclic compound to liberate a hydrogen halide and produce an N-acylsulfanilyl heterocycle, followed by hydrolysis to remove the acyl group.

2. A method for making a phenyl pyridyl sulfone compound, comprising reacting a salt of benzene sulfinic acid having in p-position to the sulfinic acid group a radical having nuclearly bound nitrogen and selected from the class consisting of the amino group, acyl-amino groups and the nitro group, with a halogenated pyridine compound having in p-position to halogen a member of the class consisting of an amino group, a group hydrolizable to an amino group and a group reducible to an amino group.

3. A method for making a phenyl pyridyl sulfone compound, comprising hydrolyzing a salt of benzene sulfinic acid having in p-position to the sulfinic acid group a group convertible into an amino group, with a halogenated pyridine compound having in p-position to halogen a nitro group.

4. A method for making a phenyl pyridyl sulfone compound, comprising hydrolyzing a salt of benzene sulfinic acid having in p-position to the sulfinic acid group a group convertible into an amino group, with a halogenated pyridine compound having in p-position to halogen a nitro group and converting the group convertible into an amino group and the nitro group into amino groups.

5. A method for making a phenyl pyridyl sulfone compound, comprising reacting an alkali salt of p-acylamino benzene sulfinic acid with 2-chloro-5-nitro pyridine and converting the acylamino group and the nitro group into amino groups.

6. A method of preparing 2-(N-acylsulfanilyl)-5-nitropyridines which comprises reacting a p-acylaminobenzene sulfinic acid with a 2-halo-5-nitropyridine.

7. The process which comprises reacting p-acetylaminobenzene sulfinic acid with 2-chloro-5-nitropyridine.

8. The process of preparing 2-(N-acylsulfanilyl)-5-nitropyridines which comprises reacting an alkali metal salt of a p-acylaminobenzene sulfinic acid with a 2-halo-5-nitro pyridine.

9. Process for preparing 4 amino phenyl 5'-amino-2'-pyridyl sulfone which comprises hydrolyzing the acylamino group and reducing the nitro group of 4-acylamino phenyl 5'-nitro-2'-pyridyl sulfone.

10. A method of preparing 2-(N-acylsulfanilyl)-5-amino pyridines which comprises reacting a p-acylamino-benzene sulfinic acid with 2-chloro-5-nitropyridine and subjecting the reaction product to reduction whereby the nitro group is converted to the amino group.

11. The process which comprises reducing 2-(N-acetylsulfanilyl)-5-nitropyridine to 2-(N-acetylsulfanilyl)-5-aminopyridine.

12. A method of preparing 2-(N-acylsulfanilyl)-5-aminopyridines which comprises reacting a p-acylamino-benzene sulfinic acid with a 2-halo-5-nitropyridine and subjecting the reaction product to reduction, whereby the nitro group is converted to an amino group.

13. A sulfone compound of the following formula

wherein YN and NY' each represents a member of the class consisting of an amino group, a group hydrolizable to an amino group and a group reducible to an amino group, and wherein YN and NY' are in the p-position to the SO₂ group, while R indicates a benzene radical and R' a pyridine radical, the sulfur being directly joined to carbon atoms of both the nuclei R and R'.

14. 2-(N-acylsulfanilyl)-5-nitropyridines having the following general formula:

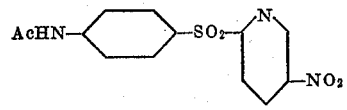

in which Ac is an acyl radical.

15. A para-amino benzene sulfo pyridine of the formula:

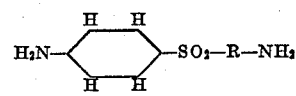

in which —R—NH₂ is an amino pyridine radical in which the amino group is para to the —SO₂— group.

16. 2-(N-acylsulfanilyl)-5-aminopyridines having the following general formula:

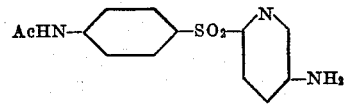

in which Ac is an acyl radical.

17. p-Acetylamino phenyl-p'-amino pyridyl sulfone of the following formula

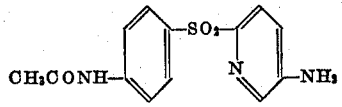

18. p-Acetylamino phenyl-p'-nitro pyridyl-2'-sulfone having a melting point of 225–226° C.

19. A reaction product containing p-amino benzene-p'-amino pyridyl-2'-sulfone of the formula
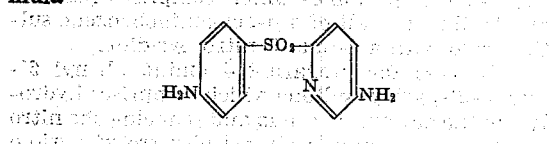
MAX DOHRN.
OTTO LAUBEREAU.
REFERENCES CITED
The following references are of record in the file of this patent:
UNITED STATES PATENTS
| Number | Name | Date |
|---|---|---|
| 1,936,721 | Landers | Nov. 28, 1933 |
| 2,202,933 | Tisza | June 4, 1940 |
| 2,227,400 | Roblin et al. | Dec. 31, 1940 |
OTHER REFERENCES
Journal Amer. Chem. Soc., vol. 62, pp. 3508–3510 (1940); ibid., vol. 63, pp. 1930–1934 (1941).

Certificate of Correction

Patent No. 2,456,258.                                                                December 14, 1948.

MAX DOHRN ET AL.

It is hereby certified that error appears in the printed specification of the above numbered patent requiring correction as follows:

Column 2, line 54, for the word "sulfuric" read *sulfinic*;

and that the said Letters Patent should be read with this correction therein that the same may conform to the record of the case in the Patent Office.

Signed and sealed this 5th day of April, A. D. 1949.

[SEAL]

THOMAS F. MURPHY,
*Assistant Commissioner of Patents.*